(12) United States Patent
Abraham et al.

(10) Patent No.: US 9,800,389 B2
(45) Date of Patent: Oct. 24, 2017

(54) SYSTEMS AND METHODS FOR DISCOVERING AND SYNCHRONIZING WITHIN A NEIGHBOR AWARE NETWORK

(71) Applicant: QUALCOMM Incorporated, San Diego, CA (US)

(72) Inventors: Santosh Paul Abraham, San Diego, CA (US); George Cherian, San Diego, CA (US); Alireza Raissinia, Monte Sereno, CA (US); Guido Robert Frederiks, Aptos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 14/198,040

(22) Filed: Mar. 5, 2014

(65) Prior Publication Data
US 2014/0254569 A1 Sep. 11, 2014

Related U.S. Application Data

(60) Provisional application No. 61/775,314, filed on Mar. 8, 2013.

(51) Int. Cl.
| | |
|---|---|
| *H04W 84/12* | (2009.01) |
| *H04L 5/00* | (2006.01) |
| *H04W 8/00* | (2009.01) |
| *H04W 48/16* | (2009.01) |
| *H04W 52/02* | (2009.01) |
| *H04W 56/00* | (2009.01) |
| *H04W 76/02* | (2009.01) |

(52) U.S. Cl.
CPC ........... *H04L 5/0092* (2013.01); *H04W 8/005* (2013.01); *H04W 48/16* (2013.01); *H04W 52/0216* (2013.01); *H04W 52/0229* (2013.01); *H04W 56/0015* (2013.01); *H04W 76/023* (2013.01); *H04W 84/12* (2013.01); *Y02B 60/50* (2013.01)

(58) Field of Classification Search
None
See application file for complete search history.

(56) References Cited

U.S. PATENT DOCUMENTS

| | | |
|---|---|---|
| 2008/0031210 A1 | 2/2008 | Abhishek et al. |
| 2009/0016250 A1 | 1/2009 | Li et al. |
| 2009/0097464 A1* | 4/2009 | Sakoda ................. H04W 48/08 370/338 |
| 2011/0103264 A1 | 5/2011 | Wentink |

(Continued)

OTHER PUBLICATIONS

International Search Report and Written Opinion—PCT/US2014/021361—ISA/EPO—dated Jun. 26, 2014.

*Primary Examiner* — Andrew Lai
*Assistant Examiner* — M Mostazir Rahman
(74) *Attorney, Agent, or Firm* — Knobbe, Martens, Olson & Bear, LLP

(57) ABSTRACT

Methods, devices, and computer program products for optimization of message transmission intervals in a NAN are described herein. In one aspect, a method for discovering a cluster of STA's forming a NAN is provided. The method includes generating a NAN beacon at an access point (AP). The NAN beacon includes timing information for the NAN. The timing information indicates a first time interval when one or more messages can be transmitted within the NAN. The method further includes transmitting the NAN beacon.

23 Claims, 11 Drawing Sheets

(56) References Cited

U.S. PATENT DOCUMENTS

2011/0153773 A1    6/2011    Vandwalle et al.
2011/0161697 A1    6/2011    Qi et al.
2012/0327829 A1*  12/2012  Sinha ................ H04W 72/0446
                                                                      370/311
2013/0337771 A1*  12/2013  Klein ...................... H04W 4/22
                                                                      455/411

* cited by examiner

SYSTEMS AND METHODS FOR DISCOVERING AND SYNCHRONIZING WITHIN A NEIGHBOR AWARE NETWORK

CROSS-REFERENCE TO RELATED APPLICATIONS

This application claims the benefit under 35 U.S.C. §119 (e) of U.S. Provisional Application No. 61/775,314, filed Mar. 8, 2013, which is hereby expressly incorporated by reference in its entirety.

BACKGROUND

Field

The present application relates generally to wireless communications, and more specifically to systems, methods, and devices for discovering and synchronizing within a neighbor aware network (NAN).

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit and/or receive information to and from each other. To carry out various communications, the devices may need to coordinate according to a protocol. As such, devices may exchange information to coordinate their activities. Improved systems, methods, and devices for coordinating transmitting and sending communications within a wireless network are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method of communicating in a neighbor aware network (NAN). The method includes generating via an access point (AP) a NAN beacon, the NAN beacon including timing information for the NAN. The timing information indicates a first time interval when one or more messages can be transmitted within the NAN. The method further includes transmitting the NAN beacon.

In one aspect, the disclosure provides an apparatus for communicating in a neighbor aware network (NAN). The apparatus includes a processor configured to generate via an access point (AP) a NAN beacon. The NAN beacon includes timing information for the NAN. The timing information indicates a first time interval when one or more messages can be transmitted within the NAN. The apparatus further includes a transmitter configured to transmit the NAN beacon on the neighbor aware network.

In another aspect, the disclosure provides an apparatus for communicating in a neighbor aware network (NAN). The apparatus includes means for generating via an access point (AP) a NAN beacon. The NAN beacon includes timing information for the NAN. The timing information indicates a first time interval when one or more messages can be transmitted within the NAN. The apparatus further includes means for transmitting the NAN beacon.

In another aspect, the disclosure provides a computer readable storage medium comprising instructions that when executed cause a processor to perform a method of communicating in a neighbor aware network (NAN). The method includes generating via an access point (AP) a NAN beacon. The NAN beacon includes timing information for the NAN. The timing information indicates a first time interval when one or more messages can be transmitted within the NAN. The method further includes transmitting the NAN beacon.

In another aspect, the disclosure provides a method of saving power in a wireless device when operating in a neighbor aware network. The method includes receiving a first message from an access point (AP), the first message indicating discovery query window information. The discovery query window information includes a first time interval when one or more discovery query messages are transmittable on the neighbor aware network. Each discovery query message requests one or more services. The method further includes transmitting one or more discovery query messages during the first time interval, entering a sleep state during at least a portion of the first time interval, and waking from the sleep state to receive a second message during a second time interval. The second message indicates one or more services that may be provided by a node within the NAN.

In another aspect, the disclosure provides an apparatus for saving power in a wireless device when operating in a neighbor aware network. The apparatus includes a receiver configured to receive a first message from an access point (AP), the first message indicating discovery query window information. The discovery query window information includes a first time interval when one or more discovery query messages are transmittable on the neighbor aware network. Each discovery query message requests one or more services. The apparatus further includes a processor configured to cause the wireless device to enter a sleep state during at least a portion of the first time interval and to wake the wireless device from the sleep state to receive a second message during a second time interval. The second message indicates one or more services that may be provided by a node within the NAN.

In another aspect, the disclosure provides an apparatus for saving power in a wireless device when operating in a neighbor aware network. The apparatus includes means for receiving a first message from an access point (AP), the first message indicating discovery query window information. The discovery query window information includes a first time interval when one or more discovery query messages are transmittable on the neighbor aware network. Each discovery query message requests one or more services. The apparatus further includes means for transmitting one or more discovery query messages during the first time interval, means for entering a sleep state during at least a portion of the first time interval, and means for waking from the sleep state to receive a second message during a second time interval. The second message indicates one or more services that may be provided by a node within the NAN.

In another aspect, the disclosure provides a computer readable storage medium comprising instructions that when executed cause a processor to perform a method of saving power in a wireless device when operating in a neighbor aware network. The method includes receiving a first message from an access point (AP), the first message indicating discovery query window information. The discovery query window information includes a first time interval when one or more discovery query messages are transmittable on the neighbor aware network. Each discovery query message requests one or more services. The method further includes transmitting one or more discovery query messages during the first time interval, entering a sleep state during at least a portion of the first time interval, and waking from the sleep state to receive a second message during a second time interval. The second message indicates one or more services that may be provided by a node within the NAN.

DETAILED DESCRIPTION

Figure 1A:
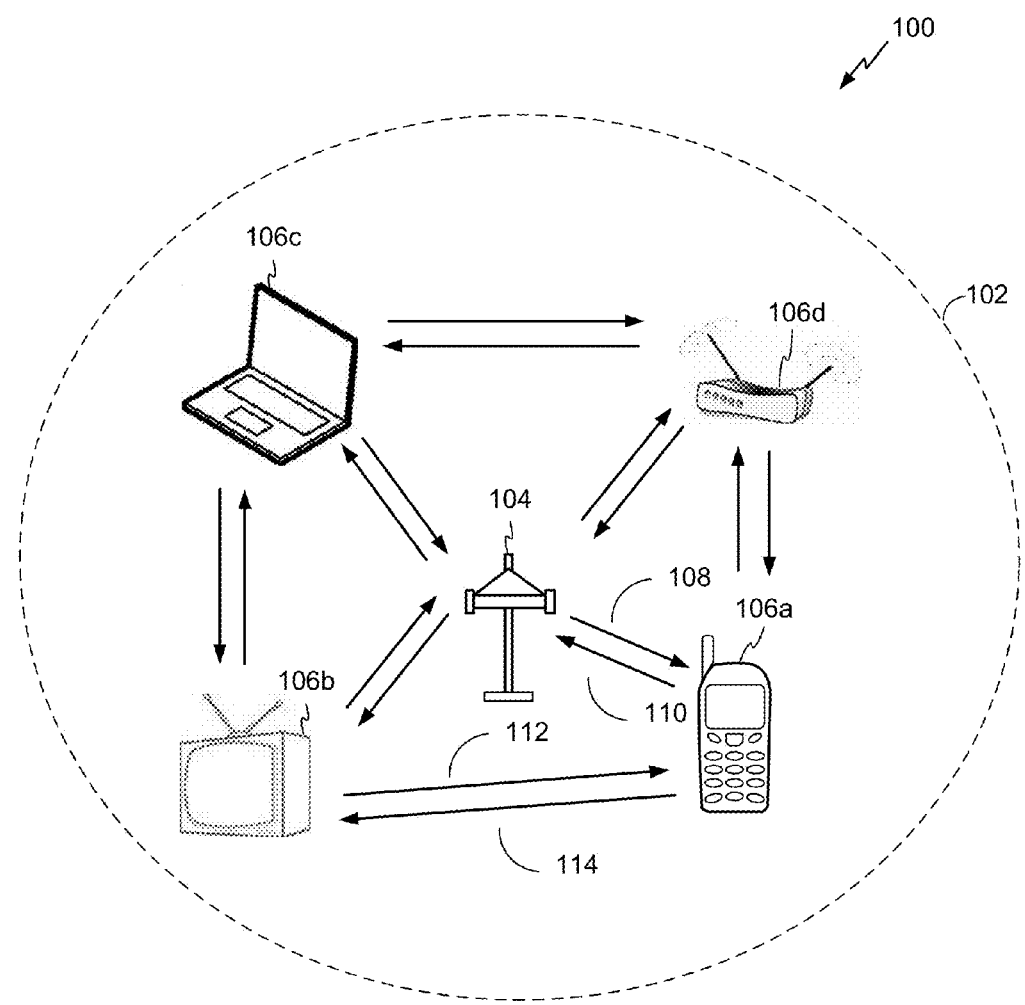
FIG. 1a illustrates an example of a wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, one or more nodes of a peer to peer network may transmit discovery and synchronization messages to coordinate one or more availability windows for communication between nodes of the peer to peer network. As nodes enter a peer to peer network, the node scans the airwaves for discovery and synchronization information. Nodes 106 within the peer to peer network repeatedly wake from a sleep state to periodically transmit and/or receive synchronization messages. It would be advantageous if the nodes 106 were able to stay longer in a sleep state to conserve power and not wake from the sleep state to transmit and/or receive synchronization messages on the network. In addition, the transmission and retransmissions of synchronization messages by the nodes 106 may introduce a large amount of unnecessary overhead to the network.

These synchronization and discovery messages may be transmitted on a fixed interval. For example, these synchronization and discovery messages may be transmitted once every 5, 10, 20, 50, or 100 availability windows. However, a fixed interval may be problematic as too short an interval may result in unnecessary network overheard, while too long an interval may result in synchronization error due to clock drift. Thus, it may be beneficial to optimize the intervals between synchronization messages in order to minimize synchronization errors while also minimizing unnecessary network overhead. It may also be beneficial to optimize the timing and duration of intervals used for nodes on the neighbor aware network to exchange discovery messages. This may ensure that adequate time is reserved for discovery queries and discovery query responses, so as to avoid excessive collisions which result in a need for costly retransmissions.

FIG. 1a illustrates an example of a wireless communication system 100. The wireless communication system 100 may operate pursuant to a wireless standard, such as an 802.11 standard. The wireless communication system 100 may include an AP 104, which communicates with STAs. In some aspects, the wireless communication system 100 may include more than one AP. Additionally, the STAs may communicate with other STAs. As an example, a first STA 106a may communicate with a second STA 106b. As another example, a first STA 106a may communicate with a third STA 106c although this communication link is not illustrated in FIG. 1a.

A variety of processes and methods may be used for transmissions in the wireless communication system 100 between the AP 104 and the STAs and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs and between an individual STA, such as the first STA 106a, and another individual STA, such as the second STA 106b, in accordance with CDMA techniques. If this is the case, the wireless communication system 100 may be referred to as a CDMA system.

A communication link may be established between STAs. Some possible communication links between STAs are illustrated in FIG. 1a. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs associated with the AP 104 and that use the AP 104 for communication may be referred to as a basic service set (BSS).

It should be noted that the wireless communication system 100 may not have a central AP 104, but rather may function as a peer-to-peer network between the STAs. Accordingly, the functions of the AP 104 described herein may alternatively be performed by one or more of the STAs.

Figure 1B:
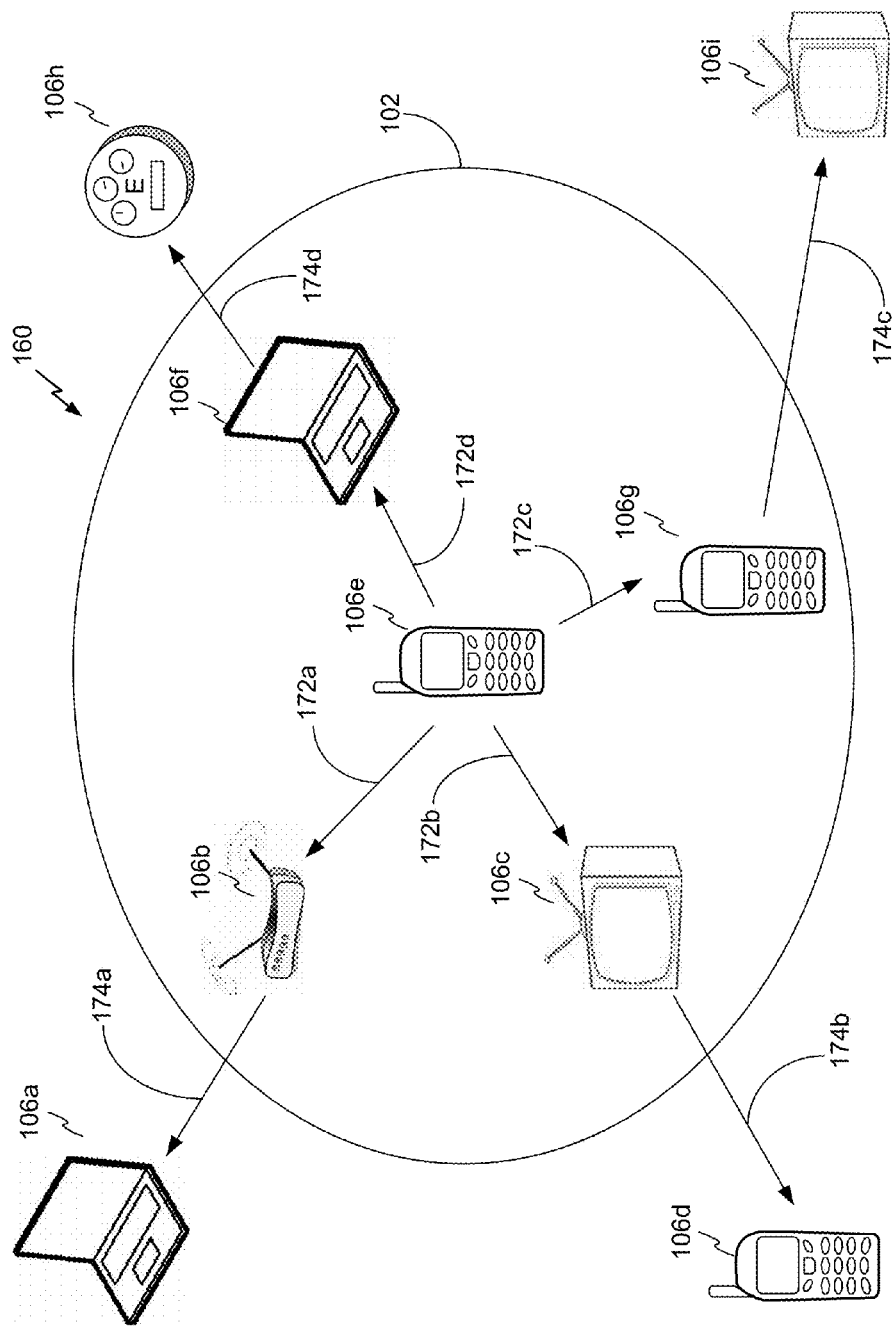
FIG. 1b illustrates another example of a wireless communication system.

FIG. 1b illustrates an example of a wireless communication system 160 that may function as a peer-to-peer network. For example, the wireless communication system 160 in FIG. 1b shows STAs 106a-106i that may communicate with each other without the presence of an AP. As such, the STAs, 106a-106i may be configured to communicate in different ways to coordinate transmission and reception of messages to prevent interference and accomplish various tasks. In one aspect, the networks shown in FIG. 1b may be configured as a "neighbor aware network" (NAN). In one aspect, a NAN may refer to a network for communication between STAs that are located in close proximity to each other. In some cases the STAs operating within the NAN may belong to different network structures (e.g., STAs in different homes or buildings as part of independent LANs with different external network connections).

In some aspects, a communication protocol used for communication between nodes on the peer to peer communications network 160 may schedule periods of time during which communication between network nodes may occur. These periods of time when communication occurs between STAs 106a-106i may be known as availability windows. An availability window may include a discovery interval as discussed further below.

The protocol may also define other periods of time when no communication between nodes of the network is to occur. In some embodiments, nodes may enter one or more sleep states when the peer to peer network 160 is not in an availability window. Alternatively, in some embodiments, portions of the stations 106a-i may enter a sleep state when the peer to peer network is not in an availability window. For example, some stations may include networking hardware that enters a sleep state when the peer to peer network is not in an availability window, while other hardware included in the STA, for example, a processor, an electronic display, or the like do not enter a sleep state when the peer to peer network is not in an availability window.

The peer to peer communication network 160 may assign one node to be a root node. In FIG. 1b, the assigned root node is shown as STA 106e. In peer to peer network 160, the root node is responsible for periodically transmitting synchronization signals to other nodes in the peer to peer network. The synchronization signals transmitted by root node 160e may provide a timing reference for other nodes 106a-d and 106f-i to coordinate an availability window during which communication occurs between the nodes. For example, a synchronization message 172a-172d may be transmitted by root node 106e and received by nodes 106b-106c and 106f-106g. The synchronization message 172 may provide a timing source for the STAs 106b-c and 106f-106g. The synchronization message 172 may also provide updates to a schedule for future availability windows. The synchronization messages 172 may also function to notify STAs 106b-106c and 106f-106g that they are still present in the peer to peer network 160.

Some of the nodes in the peer to peer communication network 160 may function as branch synchronization nodes. A branch synchronization node may retransmit both availability window schedule and master clock information received from a root node. In some embodiments, synchronization messages transmitted by a root node may include availability window schedule and master clock information. In these embodiments, the synchronization messages may be retransmitted by the branch synchronization nodes. In FIG. 1b, STAs 106b-106c and 106f-106g are shown functioning as branch-synchronization nodes in the peer to peer communication network 160. STAs 106b-106c and 106f-106g receive the synchronization message 172a-172d from root node 106e and retransmit the synchronization message as retransmitted synchronization messages 174a-174d. By retransmitting the synchronization message 172 from root node 106e, the branch synchronization nodes 106b-106c and 106f-106g may extend the range and improve the robustness of the peer to peer network 160.

The retransmitted synchronization messages 174a-174d are received by nodes 106a, 106d, 106h, and 106i. These nodes may be characterized as "leaf" nodes, in that they do not retransmit the synchronization message they receive from either the root node 106e or the branch synchronization nodes 106b-106c or 106f-106g.

Synchronization messages, or synchronization frames, may be transmitted periodically. However, periodic transmission of synchronization messages may be problematic for the nodes 106. These problems may be caused by the nodes 106 having to repeatedly wake from a sleep state to periodically transmit and/or receive synchronization messages. It would be advantageous if the nodes 106 were able to stay longer in a sleep state to conserve power and not wake from the sleep state to transmit and/or receive synchronization messages on the network.

When a new wireless device enters a location that includes a NAN, the wireless device scans the airwaves for discovery and synchronization information before joining the NAN. It would be advantageous if the information needed by the STA to join the NAN was quickly accessible to the STA without having to scan the airwaves.

In addition, the transmission and retransmissions of synchronization messages within the NAN may introduce a large amount of unnecessary overhead to the network. It would be advantageous if there was a centralized device which could provide this information to a joining STA.

Figure 2:
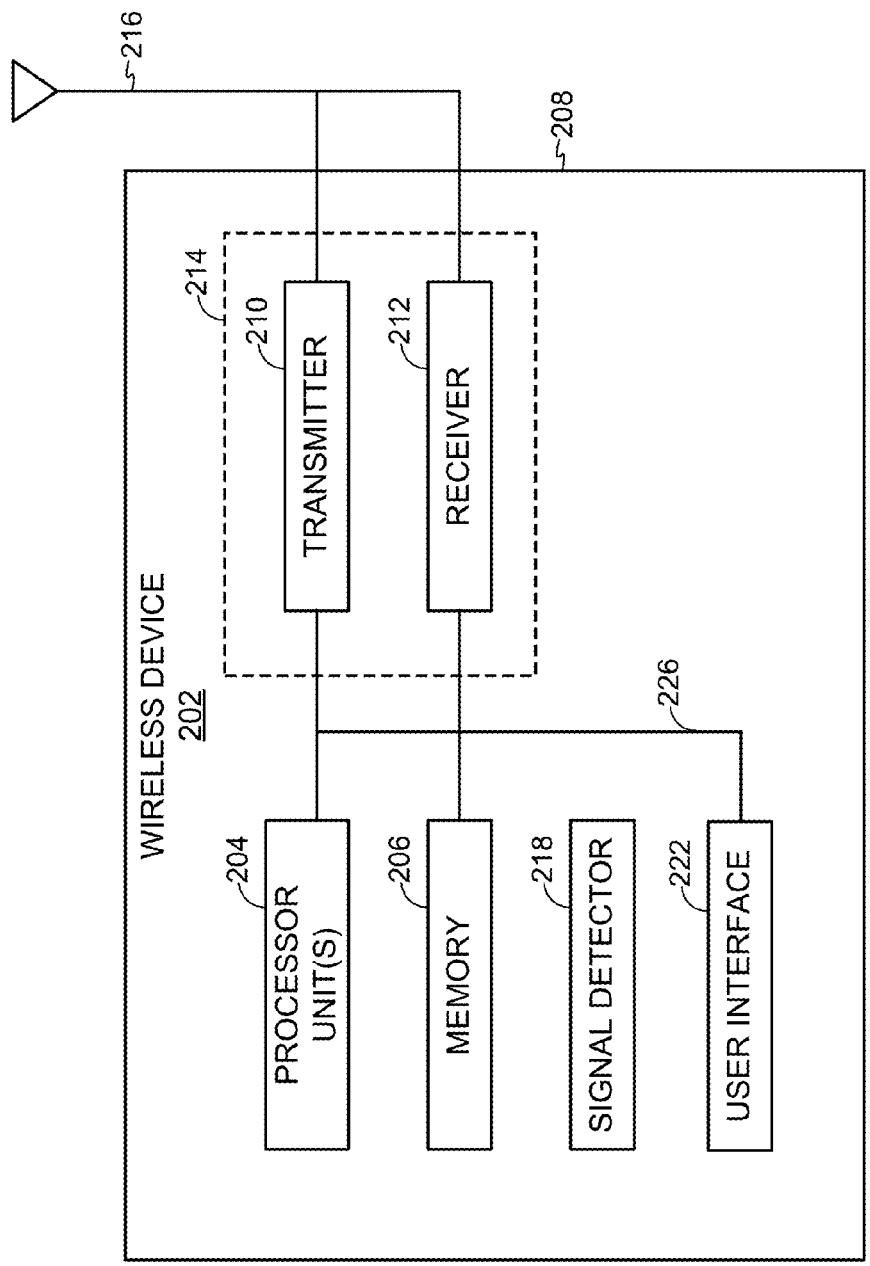
FIG. 2 illustrates a functional block diagram of a wireless device that may be employed within the wireless communication systems of FIGS. 1a and 1b.

FIG. 2 illustrates various components that may be utilized in a wireless device 202 that may be employed within the wireless communication system 100 or 160. The wireless device 202 is an example of a device that may be configured to implement the various methods described herein. For example, the wireless device 202 may comprise the AP 104 or one of the STAs.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Devices, such as STAs, 106a-i shown in FIG. 1b, for example, may be used for a neighbor aware network. For example, various stations within the network may communicate on a device to device (e.g., peer-to-peer communications) basis with one another regarding applications that each of the stations supports. A discovery protocol may be used in a NAN to enable STAs to advertise themselves (e.g., by sending discovery packets) as well as discover services provided by other STAs (e.g., by sending paging or query packets), while ensuring secure communication and low power consumption.

In a neighbor aware network or NAN, one device, such as STA or wireless device 202, in the network may be designated as the root device or node. In some embodiments, the root device may be an ordinary device, like the other devices in the network, rather than a specialized device such as a router. In NAN, the root node may be responsible for periodically transmitting synchronization messages, or synchronization signals or frames, to other nodes in the network. The synchronization messages transmitted by root node may provide a timing reference for other nodes to coordinate an availability window during which communication occurs between the nodes. The synchronization message may also provide updates to a schedule for future availability windows. The synchronization messages may also function to notify STAs that they are still present in the peer to peer network.

In a Neighbor Aware Network (NAN), STA's on the network may use synchronization messages transmitted by a root STA and retransmitted by branch STA's in order to determine availability windows. During these availability windows, STA's in the NAN may be configured to transmit and/or receive messages from other STA's on the network. At other times, STA's, or portions of STA's, on the NAN may be in a sleep state. For example, an STA on a NAN, such as wireless device 202, may enter a sleep state based at least in part on synchronization messages received from a root node. In some embodiments, STA's on a NAN may enter a sleep mode, where one or more elements of the STA may enter a sleep mode, rather than the entire STA. For example, STA 202 may enter a sleep mode where the transmitter 210, receiver 212, and/or transceiver 214 may enter a sleep mode based on synchronization messages received on a NAN. This sleep mode may enable the STA 202 to conserve power or battery life.

Figure 3:
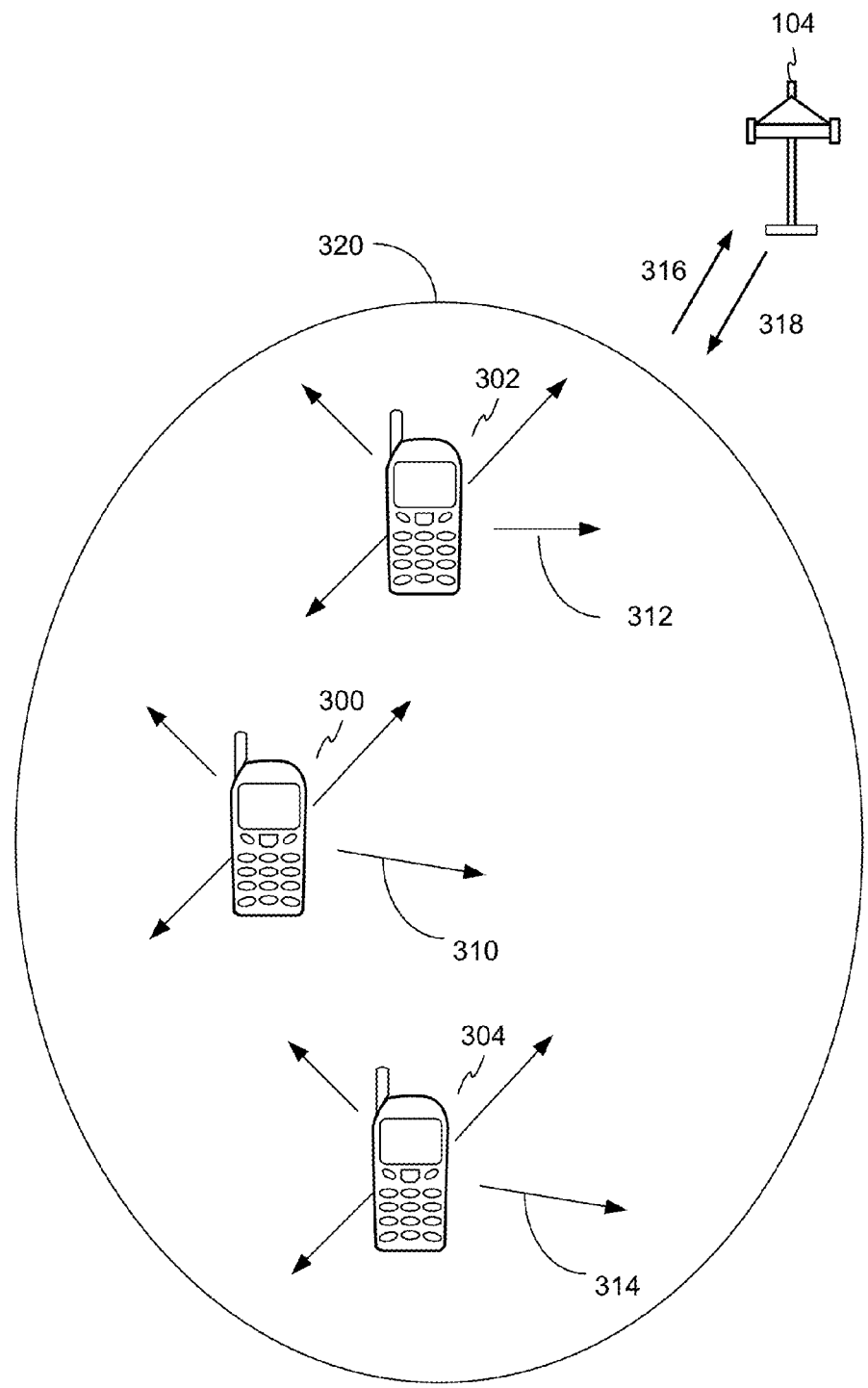
FIG. 3 illustrates an example of a communication system in which aspects of the present disclosure may be employed.

FIG. 3 illustrates an example of a NAN 320 in which aspects of the present disclosure may be employed. Rather than rely on a root node of the network, such as one of STA's 300, 302, 304, to provide discovery and/or synchronization information to the nodes, AP 104 provides this discovery and/or synchronization information to the STA's of the NAN. In this way, the AP 104 is configured to transmit and receive messages 316, 318 with the STA's on the NAN 320. For example, the AP 104 can be configured to transmit discovery and synchronization messages on some interval to the STA's.

STA's 300, 302, and 304 may be nodes on the NAN 320. As nodes on the NAN 320, STA's 300, 302, and 304 may transmit messages 310, 312, and 314 to other STA's on the network 320. These messages may be transmitted to other STA's during an availability window, during which time each STA is configured to transmit and/or receive transmissions from other STA's on the network 320. For example, STA 302 may transmit messages 312 to STA 304 during an availability window for both STA's, where the availability windows is based in part upon a synchronization message received from AP 104.

Because STA's on the NAN 320 are wireless and have a finite amount of power between charges, it is advantageous if the STA's do not repeatedly wake from a sleep state to periodically transmit and/or receive discovery and synchronization messages between the STA's of the NAN 320. Thus, it would be advantageous if the STA's 300, 302, and 304 were able to stay longer in a sleep state to conserve power and not wake from the sleep state to transmit and/or receive discovery and synchronization messages on the network.

In certain embodiments, the AP 104 aids the NAN 320 by periodically transmitting synchronization and/or discovery messages within the NAN 320. In some embodiments, synchronization messages may indicate the frequency of availability windows for STA's in the network 320, and may further indicate the frequency of synchronization messages and/or the interval until the next synchronization message. In this way, the AP 104 acts as an anchor for the NAN 320 by providing synchronization and some discovery functionality to the network 320. With the AP 104 providing centralized synchronization and/or discovery functionality, the STA's within the NAN 320 need not duplicate the functionality provided by the AP 104. For example, the STA's in the NAN 320 need not send discovery information in beacons for other STA's to discover their NAN 320. Further, the STA's in the NAN 320 do not have to associate with the AP 104. Since the AP 104 does not go to sleep, the AP 104 is able to coordinate discovery and timing for the NAN 320 independent of the states of the STA's 300, 302, and 304. In this way, the STA's 300, 302, and 304 rely on the AP 104 for this discovery functionality and can stay longer in the sleep state to save power.

In certain embodiments, multiple AP's 104 may be present in a location. Less than all of the AP's 104 may be configured to provide the discovery and/or synchronization functionality for the NAN 320 in the location. An STA entering the location can determine which of the AP's 104 include the discovery and/or synchronization functionality. For example, an AP 104 can advertise this functionality by including a signal in a beacon or probe response notifying the STA. In certain embodiments, the signal transmitted by the AP 104 is in the form of a NAN information element (IE) as described below. In this way, an AP 104 operator can configure less than all of the AP's 104 at the location to send out the beacon with the NAN IE.

In locations where multiple AP's 104 are present but some of the AP's do not provide NAN discovery and/or synchronization functionality, those AP's 104 can simply identify the AP's 104 which include the NAN discovery and/or synchronization functionality to the STA. For example, an AP 104 can provide the NAN basic service set identifier (BSSID) and/or the beacon transmission time of the AP 104 which includes the NAN discovery and/or synchronization functionality to an entering STA.

In certain implementations, the transmitted discovery queries include the NAN BSSID. In certain implementations, the responses to the transmitted discovery queries include the NAN BSSID. The NAN BSSID can be carried in one of a plurality of address fields of the query and/or response messages.

In certain embodiments, the AP 104 identifies a channel where the NAN 320 operates and provides no discovery or synchronization information to the STA for the NAN 320. Such an arrangement may be advantageous to keep messages within the NAN 320 from interfering with WLAN messages.

If more than one AP 104 in the location is configured to provide this added functionality, the STA can select one of the APs 104 based on criteria. For example, in one embodiment, the STA selects the AP 104 which has the lowest MAC address. Once the STA has selected one of the AP's 104, the STA will pick-up the discovery windows for the NAN 320 from the selected AP 104 as described below.

Figure 4:
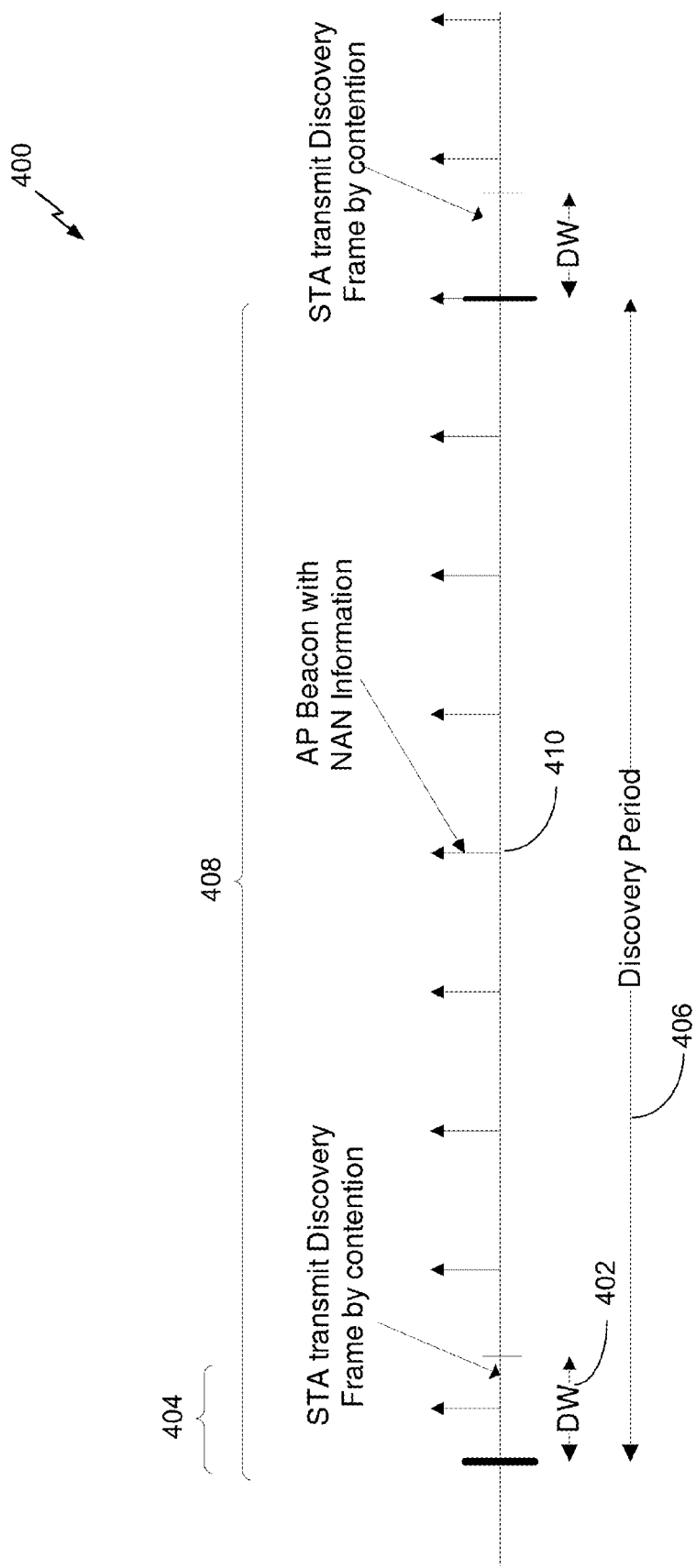
FIG. 4 illustrates an exemplary discovery window structure for an STA to communicate with an AP to discover a NAN in accordance with an exemplary implementation of the invention.

FIG. 4 illustrates an exemplary discovery window structure for an STA to communicate with AP 104 to discover the NAN 320 in accordance with an exemplary implementation of the invention. The exemplary discovery window structure 400 can include a discovery window (DW) 402 of time duration 404 and an overall discovery period (DP) 406 interval of time duration 408. In some aspects, communications can occur via other channels as well. Time increases horizontally across the page over the time axis.

An STA entering a location can send a request for a NAN 320. In certain implementations, the STA does not send a request and instead listens for a beacon 410. The AP 104 aiding the NAN 320 with synchronization and discovery functionality transmits a response to the request or transmits its beacon 410 independent of whether the AP 104 received a request from the entering STA. The response can be, for example, a probe response or the beacon 410. In certain implementations, the AP 104 periodically transmits the beacon 410 to advertise that the AP 104 provides synchronization and discovery functionality for the NAN 320.

An STA in the sleep mode or power-save mode can awake or return to normal operation or full power mode at the beginning of the beacon 410 to enable listening by the STA. In some aspects, the STA can awake or return to normal operation or full power mode at other times when the STA expects to communicate with another device, or as a result of receiving a notification packet instructing the STA to awake. The STA can awake early to ensure that the STA receives the beacon 410. The beacon includes an information element, described below, which at least identifies the NAN 320 responsive to the request.

During the DW 402, STAs can advertise services through broadcast messages such as discovery packets or discovery frames. The AP 104 listens to broadcast messages transmitted by the STAs. In some aspects, the duration of DWs can vary over time. In other aspects, the duration of the DW can remain fixed over a period of time. The end of the DW 402 can be separated from the beginning of the subsequent DW by a first remainder period of time as illustrated in FIG. 4.

The overall interval of duration 408 can measure the period of time from the beginning of one DW to the beginning of a subsequent DW as illustrated in FIG. 4. In some embodiments, the duration 408 can be referred to as a discovery period (DP). In some aspects, the duration of the overall interval can vary over time. In other aspects, the duration of the overall interval can remain constant over a period of time. At the conclusion of the overall interval of duration 408, another overall interval can begin, including a DW and the remainder interval. Consecutive overall intervals can follow indefinitely or continue for a fixed period of time.

An STA can enter a sleep or power-save mode when the STA is not transmitting or listening or is not expecting to transmit or listen. As an example, the STA can sleep after sending its probe or discovery request to the AP 104. The probe request can include a request for a specific class of service. In certain embodiments, the STA can send its probe or discovery request at any time.

The AP 104 can aggregate probe requests received from the STAs during the DW 402. The AP 104 transmits the aggregated probe or discovery queries during the DW 402. STA's within the NAN 320 transmit responses to the transmitted probe or discovery queries during the DP 406. As explained below, the allocated time for transmitting responses to the transmitted probe or discovery queries can, for example, overlap with the allocated time for transmitting the aggregated probe or discovery requests, be adjacent to the allocated time for transmitting the aggregated probe or discovery requests, or be at some time period after the end of the allocated time for transmitting the aggregated probe or discovery requests.

The start and end of the DW 402 can be known via numerous methods to each STA desiring to transmit a probe or discovery request. In some aspects, each STA can wait for the beacon 410 transmitted by the AP 104. The beacon 410 can specify the start and end of the DW 402.

Figure 5:
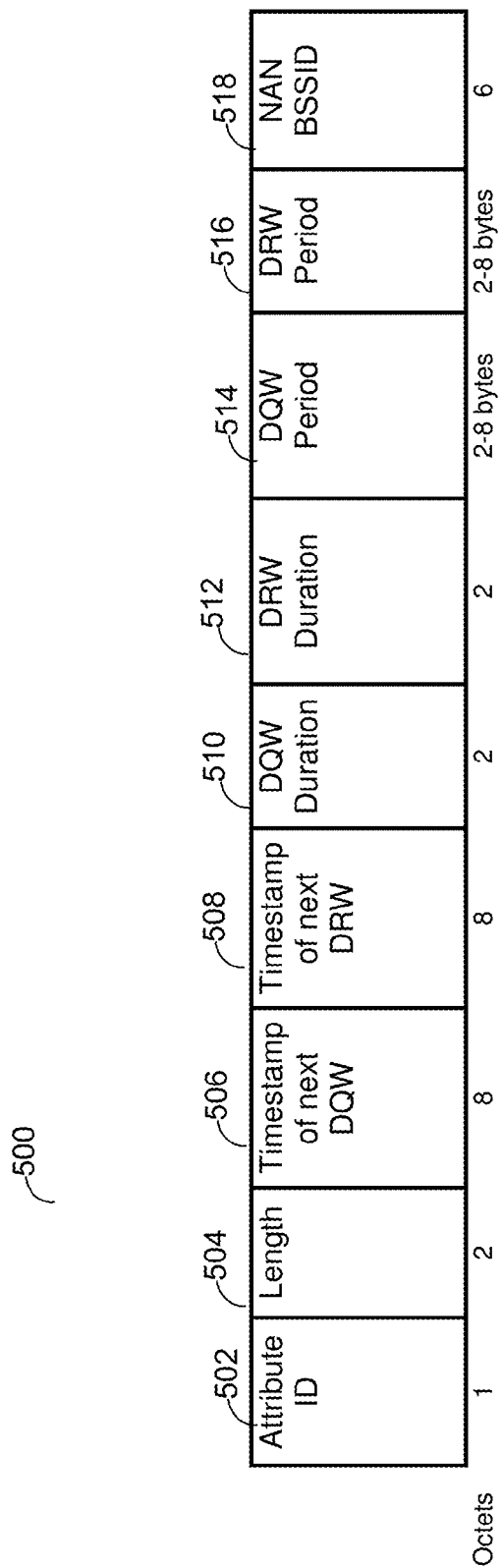
FIG. 5 shows an exemplary attribute of a NAN information element transmitted by the AP for reception by one or more STAs during the discovery period illustrated in FIG. 4.

FIG. 5 shows an exemplary attribute of a NAN information element (IE) 500 that can be employed within the NAN 320 of FIG. 3. In various embodiments, any device described herein, or another compatible device, can transmit the attribute of the NAN IE 500 such as, for example, the AP 104 (FIG. 3). One or more messages in the wireless NAN 320 can include the attribute of the NAN IE 500 such as, for example, the beacon 410.

As shown in FIG. 5, the attribute of the NAN IE 500 includes an attribute ID 502, a length field 504, a Timestamp of next Discovery Query Window (DQW) field 506, a Timestamp of next Discovery Response Window (DRW) field 508, a DQW duration field 510, a DRW duration field 512, a DQW Period field 514, a DRW Period field 516, and a NAN BSSID 518. A person having ordinary skill in the art will appreciate that the attribute of the NAN IE 500 can include additional fields, and fields can be rearranged, removed, and/or resized.

The attribute identifier field 502 shown is one octet long. In some implementations, the attribute identifier field 502 can be two, five, or twelve octets long. In some implementations, the attribute identifier field 502 can be of variable length, such as varying length from signal to signal and/or as between service providers. The attribute identifier field 502 can include a value which identifies the element as an attribute of the NAN IE 500.

The length field 504 can be used to indicate the length of the attribute of the NAN IE 500 or the total length of subsequent fields. The length field 504 shown in FIG. 5 is two octets long. In some implementations, the length field 504 can be one, five, or twelve octets long. In some implementations, the length field 504 can be of variable length, such as varying length from signal to signal and/or as between service providers.

The Timestamp of next DQW field 506 can indicate a start time of the next discovery query window (for example, the start of the next discovery period 406 described above with respect to FIG. 4). In various embodiments, the start time can be indicated using an absolute timestamp or a relative timestamp. The Timestamp of next DQR field 508 can indicate a start time of the next discovery query response (for example, the start of the next discovery query response period described below with respect to FIGS. 7-9). In various embodiments, the start time can be indicated using an absolute timestamp or a relative timestamp.

The DQW duration field 510 can indicate a duration of the DQW (for example, the duration of the DQW described below with respect to FIG. 7-9). In various embodiments, the DQW duration field 510 can indicate the duration of the DQW in ms, μs, time units (TUs), or another unit. In some embodiments, time units can be 1024 μs. The DQW duration field 510 shown is two octets long. In some implementations, DQW duration field 510 can be four, six, or eight octets long.

The DRW duration field 512 can indicate a duration of the DRW (for example, the duration of the DRW described below with respect to FIG. 7-9). In various embodiments, the DRW duration field 512 can indicate the duration of the DRW in ms, μs, time units (TUs), or another unit. In some embodiments, time units can be 1024 μs. The DRW duration field 512 shown is two octets long. In some implementations, DRW duration field 512 can be four, six, or eight octets long.

In some embodiments, the DQW period field 514 can indicate a length of the DQW (described below with respect to FIGS. 7-9). In various embodiments, the DQW period field 514 can indicate the length of the DQW in ms, μs, time units (TUs), or another unit. In some embodiments, time units can be 1024 μs. The DQW period field 514 shown is between two and eight octets long. In some implementations, the DQW period field 514 can be two, four, six, or eight octets long.

In some embodiments, the DRW period field 516 can indicate a length of the DRW (described below with respect to FIGS. 7-9). In various embodiments, the DRW period field 516 can indicate the length of the DRW in ms, μs, time units (TUs), or another unit. In some embodiments, time units can be 1024 μs. The DRW period field 516 shown is between two and eight octets long. In some implementations, the DRW period field 516 can be two, four, six, or eight octets long.

The NAN basic service set identifier (BSSID) field 518 can indicate a cluster of NAN devices (such as a MAC addresses) of the NAN 320 that is responsive to the probe or discovery request transmitted by the STA to the AP 104. In another embodiment, each NAN can have a different (for example, pseudorandom) NAN BSSID 518. In an embodiment, the NAN BSSID 518 can be based on a service application. For example, a NAN created by Application A can have a BSSID 518 based on an identifier of Application A. In some embodiments, the NAN BSSID 518 can be defined by a standards-body. In some embodiments, the NAN BSSID 518 can be based on other contextual information and/or device characteristics such as, for example, a device location, a server-assigned ID, etc. In one example, the NAN BSSID 518 can include a hash of the latitude and longitude location of the NAN. The NAN BSSID field 518 shown is six octets long. In some implementations, NAN BSSID field 518 can be four, five, or eight octets long. In some embodiments, the AP 104 can indicate the NAN BSSID 518 in an information element that does not include the Timestamps of the next DQW or DRW, the DQW or DRW durations, and/or the DQW or DRW periods.

Figure 6:
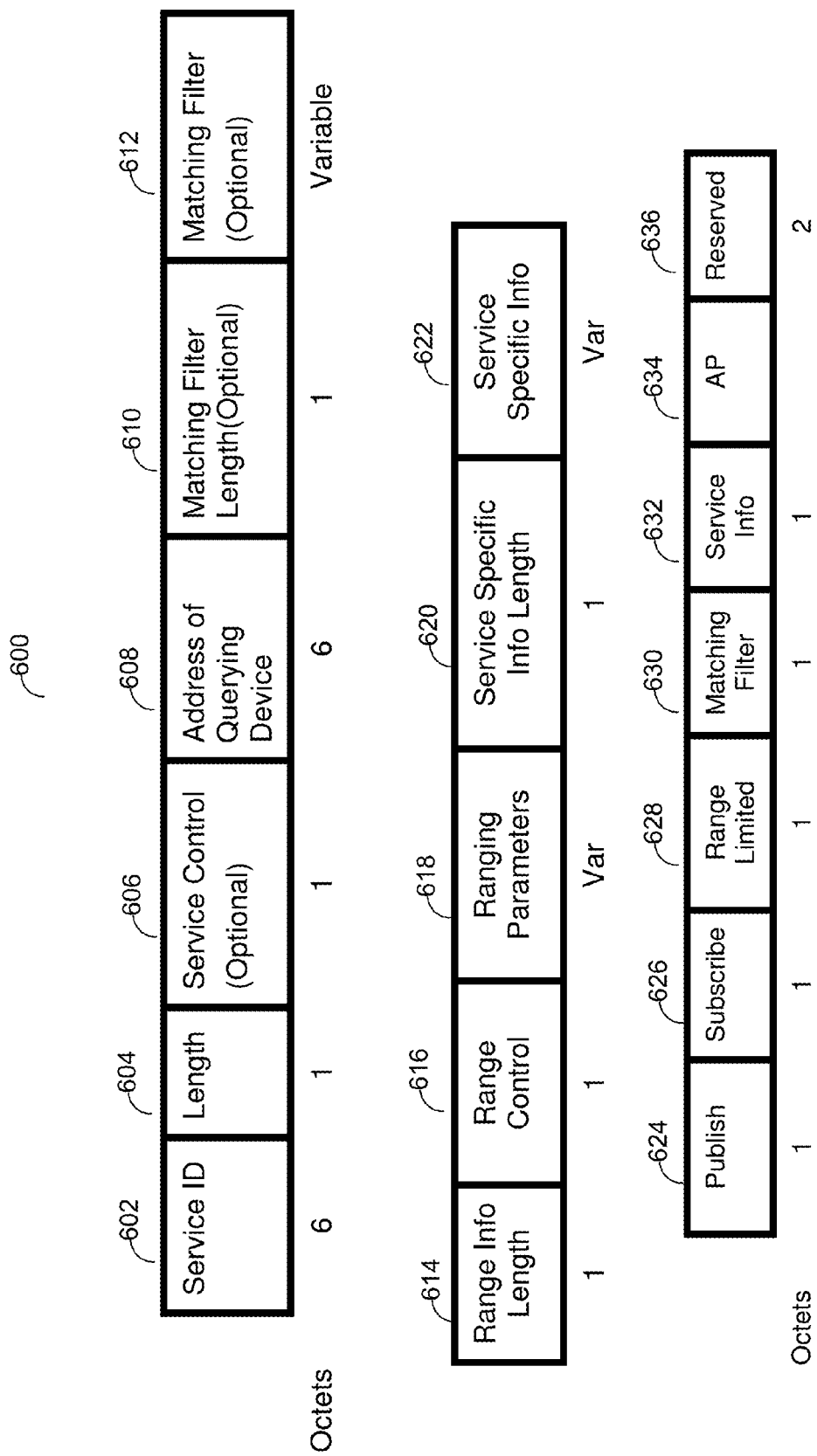
FIG. 6 shows an exemplary discovery type length value (TLV) that can be sent by the AP on behalf of an STA in response to a query sent by the STA during the discovery query window.

FIG. 6 shows an exemplary discovery type length value (TLV) 600 that can be sent by the AP 104 on behalf of an STA in response to a query sent by the STA during the discovery query window. In various embodiments, any device described herein, or another compatible device, can transmit the discovery TLV 600 such as, for example, the AP 104 (FIG. 3). One or more messages can include the discovery TLV 600 such as, for example, a discovery frame.

In the illustrated embodiment, the discovery TLV 600 includes a service identifier 602, a length field 604, a service control field 606, an address of querying device field 608, a matching filter length field 610, a matching filter field 612, a range info length field 614, a range control field 616, ranging parameters field 618, and a service-specific information container 622. A person having ordinary skill in the art will appreciate that the discovery TLV 600 can include additional fields, and fields can be rearranged, removed, and/or resized. For example, in various embodiments, the discovery TLV 600 can omit the service control field 606, the range info length field 614, the range control field 616, and/or the ranging parameters field 618.

The service identifier field 602 shown is six octets long. In some implementations, the service identifier field 602 can be two, five, or twelve octets long. In some implementations, the service identifier field 602 can be of variable length, such as varying length from signal to signal and/or as between service providers. The service identifier field 602 can include a value which identifies a service or application of a discovery frame. For example, the service identifier 602 can include a hash of a service name or other value based on a service. In some embodiments, a predetermined token value can be reserved. For example, service identifiers of all-zeros or all-ones can indicate NAN management operations.

The length field 604 can be used to indicate the length of the discovery TLV 600 or the total length of subsequent fields. The length field 604 shown in FIG. 6 is one octet long. In some implementations, the length field 602 can be two, five, or twelve octets long. In some implementations, the length field 602 can be of variable length, such as varying length from signal to signal and/or as between service providers. In some embodiments, a length of zero (or another predetermined token value) can indicate that one or more other fields (such as the service control field 606, the range info length field 614, the range control field 616, and/or the ranging parameters field 618) are not present.

The service control field 606 can include information of an applicable service. The service control field 606 shown in FIG. 6 is one octet long. In some implementations, the service control field 606 can be two, six, or eight octets long. In some implementations, the service control field 606 can be of variable length, such as varying length from signal to signal and/or as between service providers. The service control field 606 includes a publish flag 624, a subscribe flag 626, a range limited flag 628, a matching filter flag 630, a service information flag 632, an AP flag 634, and two reserved bits. A person having ordinary skill in the art will appreciate that the service control field 606 can include additional fields, and fields can be rearranged, removed, and/or resized.

The address of querying device field 608 can include an address (such as a MAC addresses) of the STA which transmitted the probe or discovery request to the AP 104. The matching filter length field 610 can indicate a length of the matching filter field 612. The matching filter field 612 can include a bit string that can be used for filtering received discovery frames.

The range information length field 614 can indicate a length of the range control field 616 and/or length of the ranging parameters field 618. The range control field 616 can include information related to the ranging parameters 618. The range control field 616 shown in FIG. 6 is one octet long. In some implementations, the range control field 616 can be two, six, or eight octets long. In some implementations, the range control field 616 can be of variable length, such as varying length from signal to signal and/or as between service providers. A person having ordinary skill in the art will appreciate that the range control field 616 can include additional fields, and fields can be rearranged, removed, and/or resized.

The ranging parameters field 618 can be used to indicate ranging information such as, for example, a ranging algorithm identification, ranging data, etc. The ranging parameters field 618 shown in FIG. 6 is variable length. In some implementations, the ranging parameters field 618 can be one, five, or twelve octets long.

The service specific information length field 620 can indicate a length of the service specific information field 622. The service-specific information container field 622 can encapsulate one or more additional data fields related to an applicable service. The service-specific information container field 622 shown in FIG. 6 is variable length. In some implementations, the service-specific information container field 622 can be one, five, or twelve octets long.

In some embodiments, the AP 104 can indicate the service identifier, service control, range control, ranging information, and/or service-specific information in an attribute of an information element, in addition to, or instead of the frame 600. For example, the attribute can be in a vendor-specific IE.

Figure 7:
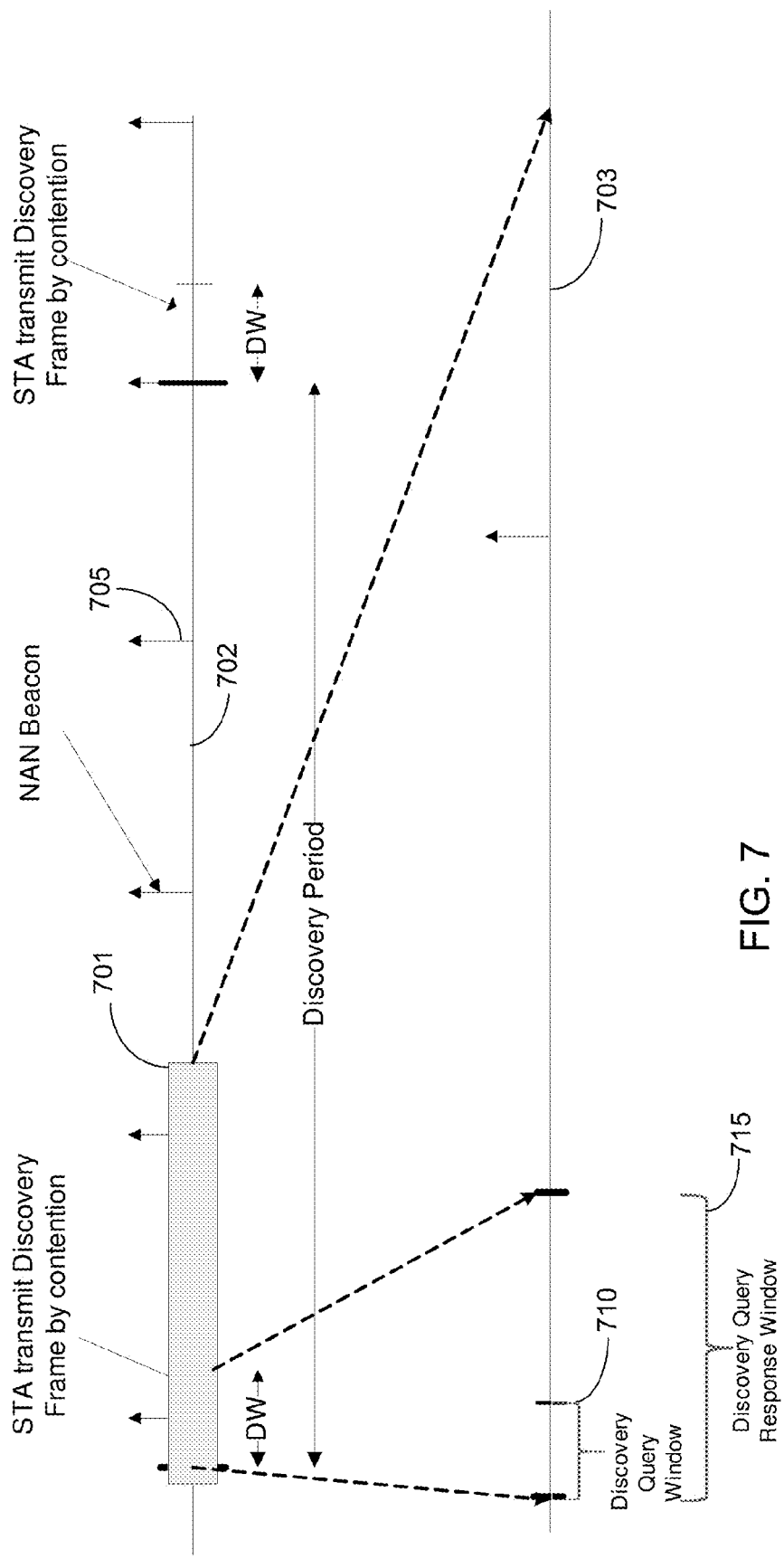
FIG. 7 shows an exemplary window structure similar to FIG. 4 with the discovery query response window overlapping the discovery query window.

FIG. 7 is a timing diagram illustrating one embodiment of a discovery query window and discovery query response window. A portion 701 of the timeline 702 is expanded as the lower timeline 703. Timeline 702 shows a series of NAN beacon signals 705. Shown on the expanded timeline 703 are a discovery window 710 and a discovery query response window 715. In the illustrated embodiment, the discovery query window 710 is completely within the discovery query response window 715.

Figure 8:
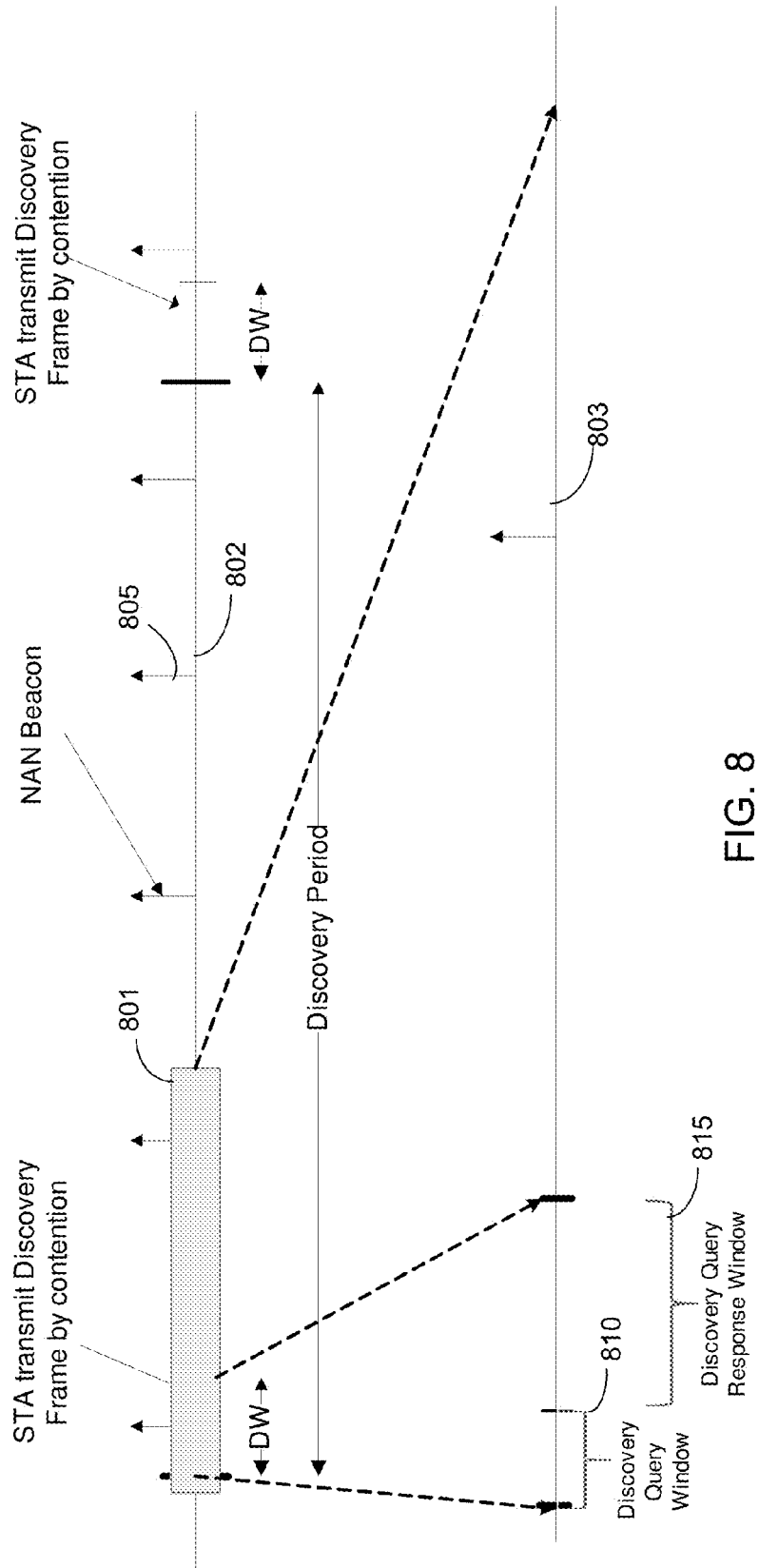
FIG. 8 shows an exemplary window structure similar to FIG. 7 with the discovery query response window being adjacent to the discovery query window.

FIG. 8 is a timing diagram illustrating one embodiment of a discovery query window and discovery query response window. A portion 801 of the timeline 802 is expanded as the lower timeline 803. Timeline 802 shows a series of AP beacon signals 805. Shown on the expanded timeline 803 are a discovery window 810 and a discovery query response window 815. In the illustrated embodiment of FIG. 8, the discovery query window 810 does not overlap the discovery query response window 815. Instead, the discovery query response window 815 immediately follows the end of the discovery query window 810.

Figure 9:
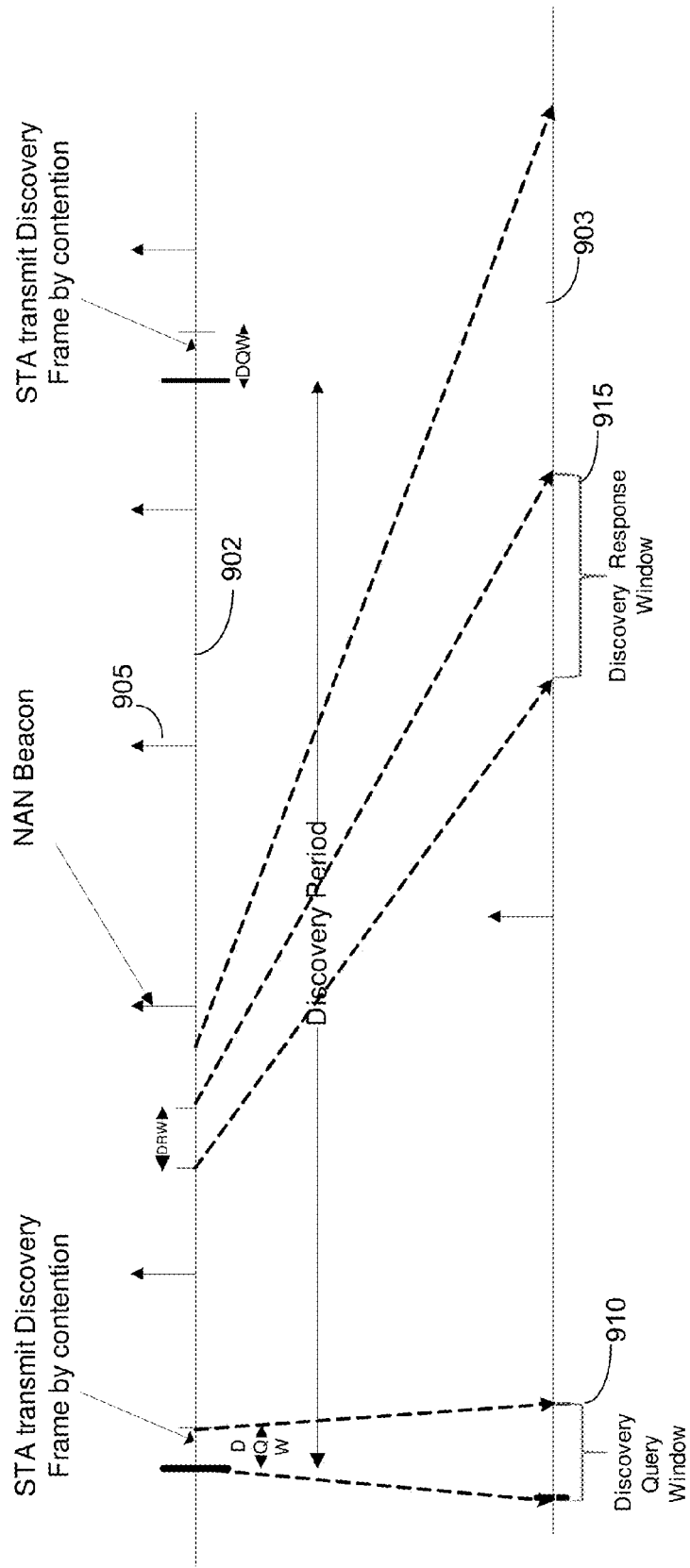
FIG. 9 shows an exemplary window structure similar to FIG. 7 with the discovery query response window and the discovery query window occurring at separate times.

FIG. 9 is a timing diagram illustrating one embodiment of a discovery query window and discovery query response window. A portion of timeline 902 is expanded as the lower timeline 903. Timeline 902 shows a series of NAN beacon signals 905. Shown on the expanded timeline 903 are a discovery window 910 and a discovery query response window 915. In the illustrated embodiment of FIG. 9, the timing of the discovery query window 910 is unrelated to the timing of the discovery query response window 915.

Figure 10:
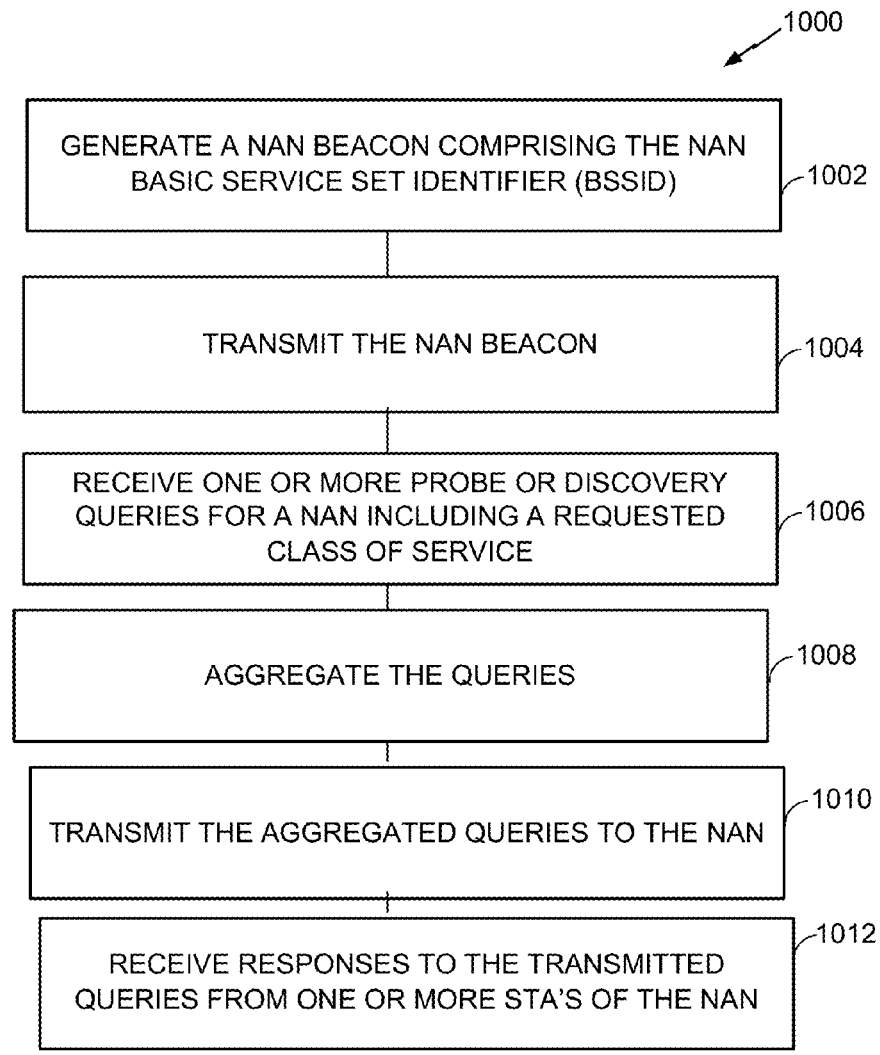
FIG. 10 is a flowchart of a method for an STA to discover a NAN aided by an AP.

FIG. 10 is a flowchart of a method 1000 for an STA to discover a NAN using in part an AP. This method may be executed by the AP 104, which may be a device such as wireless device 202.

At block 1012, the AP 104 generates a NAN beacon comprising the NAN basic service set identifier (BSSID). The NAN beacon may be used by an entering STA to discover the neighbor aware network (NAN) and/or to synchronize internal clocks so as to be able to communicate during one or more time windows with devices of the NAN. In some aspects, the NAN beacon includes NAN IE 500 as illustrated in FIG. 5. The NAN IE 500 can include the NAN BSSID field 518 described above. The beacon can further include synchronization information including one or more of the fields of the NAN IE 500. For example, the synchronization information can indicate discovery query window information. The discovery query window information indicates a time interval when discovery query messages are transmittable on the neighbor aware network. Each discovery query message requests one or more services. In some aspects, the discovery query window information further indicates a frequency or periodicity of a discovery query window. In some aspects, the discovery query window information further indicates a duration of a discovery query window.

In some aspects, method 1000 further includes transmitting a second message indicating discovery response window information. The discovery response window information includes a second time interval when discovery response messages are transmittable on the neighbor aware network. Each discovery response message responds to one of the discovery query messages and indicates one or more services that may be provided by a node transmitting the discovery response message. In some aspects, the discovery response window information further indicates a periodicity of a discovery response interval. In some aspects, the discovery response window information further indicates a duration of a discovery response interval. In some aspects, the second message is the first message. In certain embodiments, the first time interval is indicated in an attribute of a NAN Information Element included in the first message. In some aspects, the first time interval also indicates when unsolicited broadcast discovery messages may be transmitted. In some aspects, the first time interval and the second time interval overlap. In some aspects, the first time interval and the second time interval do not overlap. In some aspects, the first time interval and the second time interval are equivalent. In some aspects, the first time interval and the second time interval do not overlap. Next, at block 1004, the AP transmits the NAN beacon including the BSSID.

At block 1006, the AP 104 receives one or more probe or discovery queries for a NAN. In certain embodiments, the query includes a request for a class of service. Exemplary classes of service include music, ambient sound, ambient light, humidity, and emergency alarm sensors. Multiple queries transmitted by more than one STA may be received by the AP. The probe requests are transmitted during a discovery window.

At block 1008, the AP 104 aggregates the queries. At block 1010, the AP 104 transmits the aggregated queries during the discovery window. The transmission of the queries may overlap, be adjacent, or be spaced in time from the reception of the probe requests as illustrated in FIGS. 7-9, respectively. At block 1012, the one or more of the STAs in the NAN respond to the transmitted queries.

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-10 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of communicating in a neighbor aware network (NAN), comprising:
   generating via an access point (AP) a NAN beacon, the NAN beacon including timing information for the NAN, the timing information indicating a first time interval when one or more discovery query messages can be transmitted within the NAN, each of the one or more discovery query messages requesting one or more services;
   transmitting the NAN beacon;
   receiving a first discovery query requesting one or more services during the first time interval; and
   subsequently transmitting the first discovery query to the NAN.

2. The method of claim 1 further comprising:
   receiving a second discovery query requesting one or more services during the first time interval;
   aggregating the first and second discovery queries, wherein the subsequent transmission of the first discovery query transmits the aggregated first and second discovery queries.

3. The method of claim 1, wherein the requested class of service is ambient sound.

4. The method of claim 1, wherein the NAN beacon includes a NAN basic service set identifier (BSSID).

5. The method of claim 1, wherein the NAN beacon comprises synchronization information.

6. The method of claim 1, wherein responses to the transmitted first discovery query are received during a second time interval.

7. The method of claim 1, wherein each discovery query message includes a request for a class of service indicating one of music, ambient sound, ambient light, humidity, and emergency alarm sensors.

8. The method of claim 6, wherein the second time interval is a discovery query response window.

9. The method of claim 6, wherein the first time interval overlaps in time with the second time interval.

10. The method of claim 6, wherein the first time interval is adjacent in time with the second time interval.

11. An apparatus for communicating in a neighbor aware network (NAN), comprising:
    a processor configured to generate via an access point (AP) a NAN beacon, the NAN beacon including timing information for the NAN, the timing information indicating a first time interval when one or more discovery query messages can be transmitted within the NAN;
    a transmitter configured to transmit the NAN beacon on the neighbor aware network; and
    a receiver configured to receive a first discovery query requesting one or more services during the first time interval, wherein the transmitter is further configured to subsequently transmit the first discovery query to the NAN.

12. The apparatus of claim 11 wherein the receiver is further configured to receive a second discovery query requesting one or more services, the processor is configured to aggregate the first and second discovery queries, and the transmitter is configured to transmit the aggregated first and second discovery queries as part of the subsequent transmission of the first discovery query.

13. The apparatus of claim 11, wherein one of the one or more services is ambient sound.

14. The apparatus of claim 11, wherein the NAN beacon includes a NAN basic service set identifier (BSSID).

15. The apparatus of claim 11, wherein the NAN beacon comprises synchronization information.

16. The apparatus of claim 11, wherein responses to the transmitted first discovery query are received during a second time interval.

17. The apparatus of claim 16, wherein the second time interval is a discovery query response window.

18. The apparatus of claim 16, wherein the first time interval overlaps in time with the second time interval.

19. The apparatus of claim 16, wherein the first time interval is adjacent in time with the second time interval.

20. The apparatus of claim 16, wherein the first time interval is spaced in time from the second time interval.

21. An apparatus for communicating in a neighbor aware network (NAN), comprising:
    means for generating via an access point (AP) a NAN beacon, the NAN beacon including timing information for the NAN, the timing information indicating a first time interval when one or more discovery query messages can be transmitted within the NAN;
    means for transmitting the NAN beacon; and
    means for receiving a first discovery query requesting one or more services during the first time interval, wherein the means for transmitting is further configured to subsequently transmit the first discovery query to the NAN.

22. The apparatus of claim 21, wherein the means for receiving is further configured to receive a second discovery query requesting one or more services, the means for processing is configured to aggregate the first and second discovery queries, and the means for transmitting is configured to transmit the aggregated queries as part of the subsequent transmission of the first discovery query.

23. A non-transitory computer readable storage medium comprising instructions that when executed cause a processor to perform a method of communicating in a neighbor aware network (NAN), the method comprising:

generating via an access point (AP) a NAN beacon, the NAN beacon including timing information for the NAN, the timing information indicating a first time interval when one or more discovery query messages can be transmitted within the NAN;

transmitting the NAN beacon;

receiving a discovery query requesting one or more services during the first time interval; and subsequently transmitting the discovery query to the NAN.

* * * * *